Figure 4:
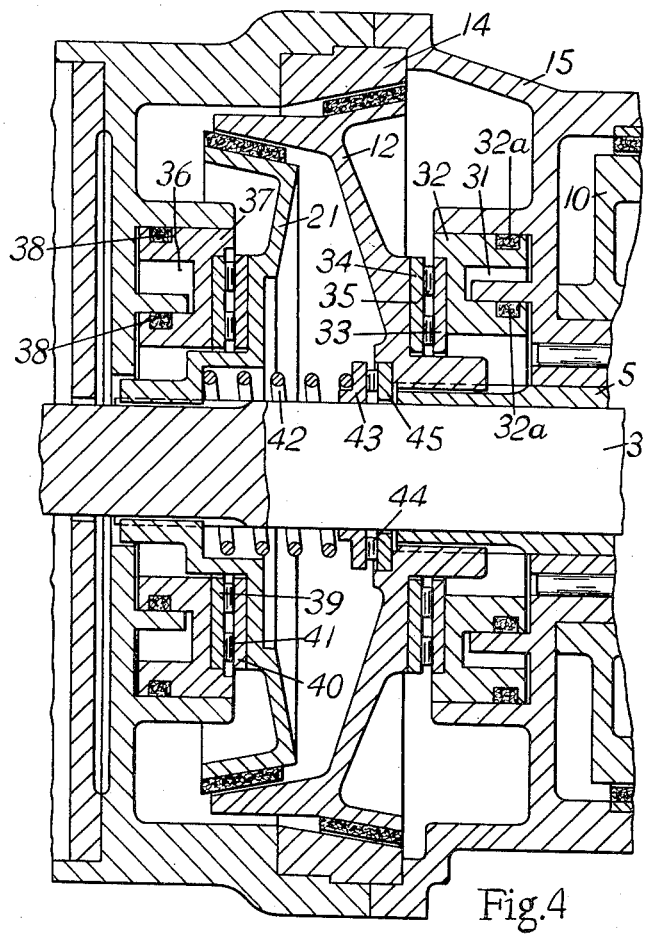

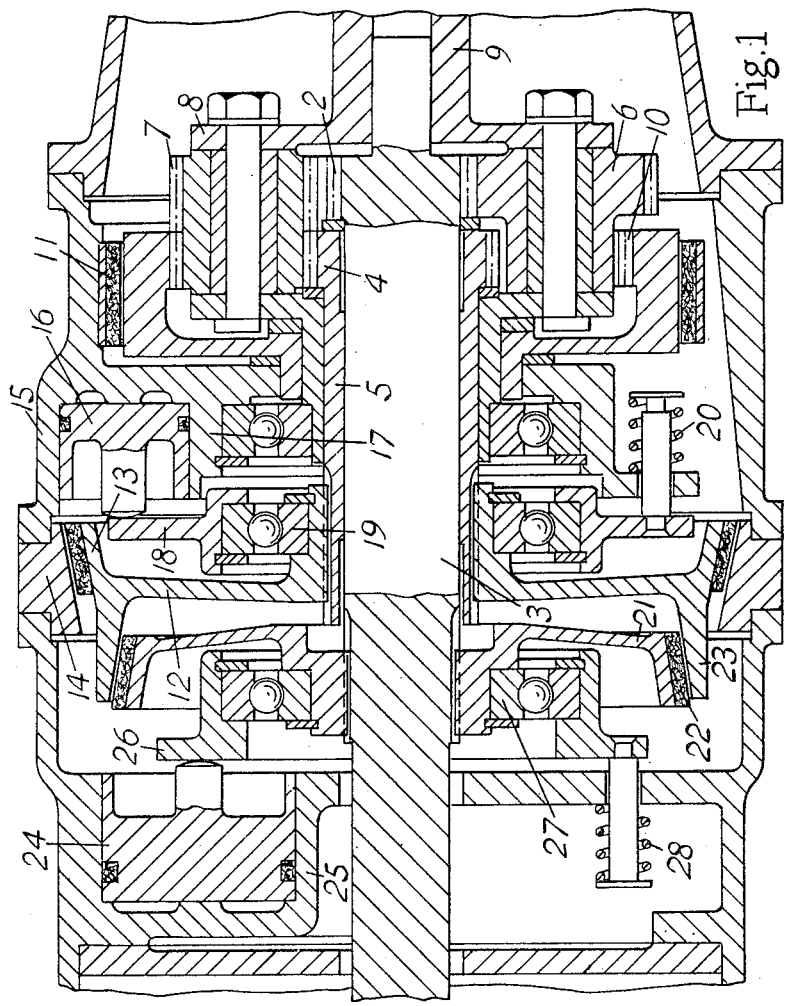

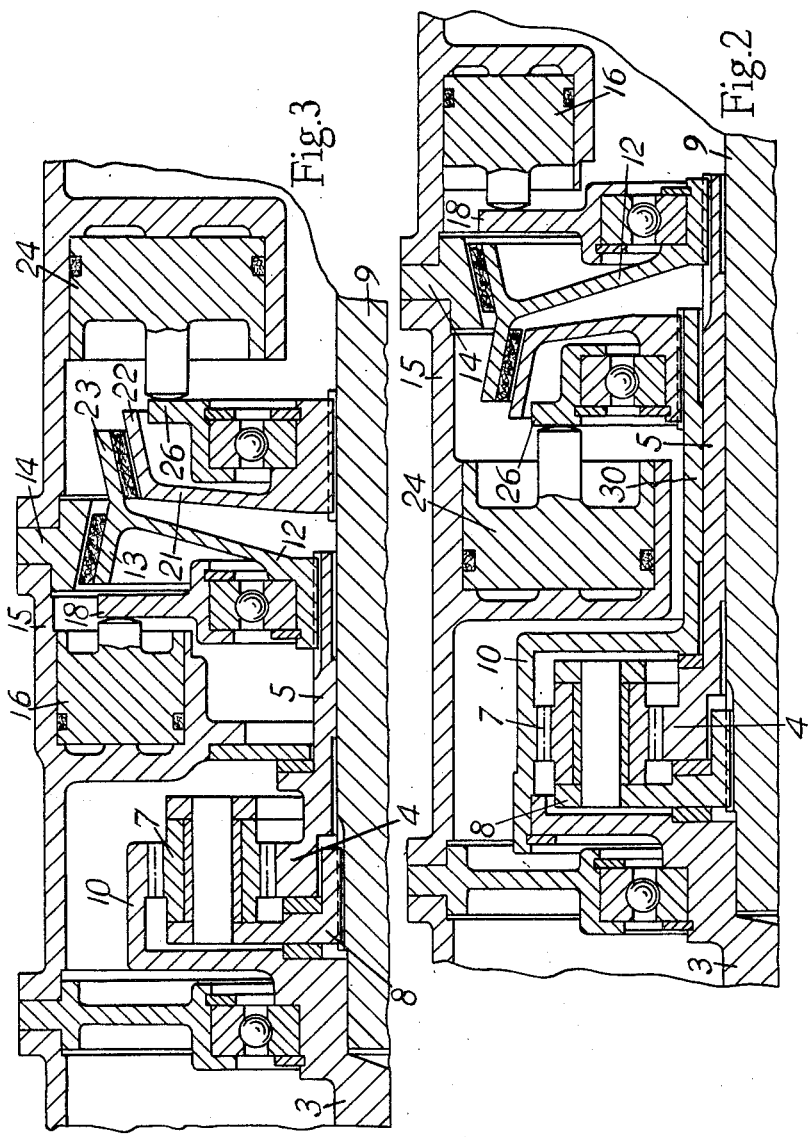

May 22, 1962  A. C. WICKMAN  3,035,458
EPICYCLIC POWER TRANSMISSION MECHANISMS
Filed May 2, 1958  3 Sheets-Sheet 3

Inventor
A. C. Wickman
By Glascock Downing Seebold
Attys.

United States Patent Office 3,035,458
Patented May 22, 1962

3,035,458
EPICYCLIC POWER TRANSMISSION
MECHANISMS
Axel C. Wickman, 14 S. Hibiscus Drive,
Miami Beach, Fla.
Filed May 2, 1958, Ser. No. 732,569
Claims priority, application Great Britain May 20, 1957
3 Claims. (Cl. 74—761)

This invention relates to variable speed epicyclic power transmission mechanisms for road vehicles or other purposes, of the kind which includes a frictional engaging means whereby the sun pinion, or one of two or more sun pinions, can be secured alternatively to the housing of the mechanism or to another rotary member of the mechanism.

The object of the invention is to enable the frictional engaging means to be arranged in a simpler and more compact form than hitherto.

A frictional engaging means in accordance with the invention comprises an axially slidable disc connected to the sun pinion to be controlled and having a peripheral rim adapted at its exterior to effect frictional engagement with a complementary part in the housing of the mechanism, a second axially slidable disc connected to another rotary member of the mechanism and having a peripheral rim adapted at its exterior to effect frictional engagement with the interior of the rim of the first mentioned disc, and hydraulic actuating means associated with each disc, the arrangement being such that movement of the first disc in one direction serves to effect its engagement with the housing, and movement of the second disc in the opposite direction serves to effect its connection with the first disc and release of the latter from the housing.

In the accompanying drawings:

FIGURE 1 is a longitudinal section of one form of epicyclic mechanism embodying the invention.

FIGURES 2 and 3 respectively illustrate applications of the invention to two other forms of epicyclic mechanism. FIGURE 4 illustrates an alternative form of the actuating means.

The example of an epicyclic mechanism for which the invention is required as shown in FIGURE 1, includes a sun pinion 2 which is formed on or secured to the power input shaft 3, and a second and adjacent sun pinion 4 which is formed on or secured to a sleeve 5 freely supported on the said shaft. The sun pinion 2 engages a planet pinion 6, and the sun pinion 4 engages a planet pinion 7, these planet pinions being interengaged. The planet pinions are mounted on a carrier 8 which is formed on or secured to a power output shaft 9. Also the planet pinion 7 is engaged by an internally toothed annulus 10 which is controlled by a frictional clutch band 11. The mechanism as so far described is known and forms no part of the invention. The invention relates to the frictional engaging means required for controlling the sun pinion 4.

According to the embodiment of the invention as shown in FIGURE 1, the sleeve 5 of the sun pinion 4 has slidably secured to it by splines a friction disc 12 having a peripheral rim extending from both sides of the disc. One part 13 of the rim is of truncated conical form and adapted at its outer surface to effect frictional engagement with the inner surface of a complementary member 14 formed on or secured to the housing 15. Axial movement of the disc in the direction for engaging it with the housing is effected by a hydraulically operated plunger 16 or plungers contained in a cylinder 17 or cylinders formed in or secured to the housing, the plunger or each plunger being arranged to act on an abutment 18 in the form of an annular disc supported by a ball bearing 19 on a central boss on the disc. Retraction of the disc is effected by a spring 20 or springs acting on the said abutment.

On the input shaft 3 is slidably secured by splines a second friction disc 21 having a peripheral rim 22 of truncated conical form, the outer surface of which is adapted to co-operate with a complementary inner surface on the other rim part 23 of the first disc 12. The second disc is movable in the direction for engaging it with the first clutch by a hydraulically operated plunger 24, or plungers, contained in another cylinder 25 or cylinders in the housing and acting on an annular abutment 26 carried by a ball bearing 27 on a central boss on the second disc. Retraction of the second disc is effected by a spring 28 or springs acting on the said abutment.

The hydraulic plunger 24 or plungers acting on the second disc is or are, of larger area than the plunger 16 or plungers acting on the first disc in order that the two frictional engaging means may be operated in the following manner. When it is required to transmit motion to the output shaft 9 at a reduced speed through the planet pinions, the first disc 12 is engaged with the housing by the action of the associated hydraulic means. When later it is required to transmit motion to the output shaft at the same speed as the input shaft 3, the second disc 21 is by means of its associated hydraulic means first caused to engage the first disc, so interlocking the two sun pinions. Continued actuation of the second hydraulic means then moves both discs jointly, and in opposition to the action of the first hydraulic means, so disconnecting the first disc from the housing and enabling the transition from low speed to high speed to be effected smoothly.

Alternatively the hydraulic plunger or plungers 24 and 16 may be of equal areas but in this case the hydraulic pressure on the plunger or plungers 24 is greater than the hydraulic pressure on the plunger or plungers 16.

In the example of an epicyclic mechanism illustrated by FIGURE 2, a single sun pinion 4 is employed. This is formed on or secured to a sleeve 5 supported on the output shaft 9. The sun pinion engages one or more planet pinions 7 mounted on a carrier 8 which has a spline connection with the output shaft 9. The planet pinion or pinions is or are engaged by an internally toothed annulus 10 secured to the input shaft 3, and from the annulus extends a sleeve 30 to which is secured the disc 21 operable by a hydraulic plunger 24 through a spring-loaded abutment 26 in a like manner to that described with reference to FIGURE 1. The disc 12 which is operable as above described by the hydraulic plunger 16 through the abutment 18 is slidably splined on the sun pinion sleeve 5 and is engageable alternatively with the disc 21 or the member 14 on the housing. For driving the output shaft at a lower speed than the input shaft, the disc 12 is engaged with the housing. For driving both shafts at the same speed the disc 12 is engaged with the disc 21.

If the gear is arranged so that the shaft associated with the carrier 8 is the input shaft and the shaft associated with the annulus 10 is the output shaft direct, the latter is driven at a higher speed when the disc 12 is engaged with the housing.

The example illustrated by FIGURE 3 is essentially similar to that illustrated by FIGURE 2, but differs in that the seocnd disc 21 is slidably splined to the output shaft 9.

The invention is not, however, restricted to the examples above described, as it may be applied in essentially the same manner to other arrangements of epicyclic mechanisms, and subordinate details may be varied to suit different requirements.

An example of an alternative mechanism for actuating the frictional engaging means is shown in FIGURE 4. In this example, there is formed in or secured to the housing 15, at one side of the disc 12, an annular hydraulic cylinder 31, and in combination with this cylinder is provided a hollow annular piston 32, the latter being so formed that one part lies within the cylinder and another part lies outside the cylinder as shown, leakage of the motive liquid being prevented by seals 32ª. On the exposed face of the piston is secured an annular thrust plate 33, and this cooperates with a similar thrust plate 34 secured to disc 12, a ring of thrust rollers 35 being located between the said rings. Likewise there is formed in or secured to the housing alongside the other disc 21 an annular cylinder 36 of larger area than the cylinder 31, and the with the cylinder 36 is combined a hollow annular piston 37, leakage of motive liquid being prevented by seals 38. On the outer face of the piston 37 is secured an annular thrust plate 39 which co-operates with a similar ring 40 on the disc 21 through a ring of thrust rollers 41. Between the two discs 12 and 21 is arranged a spring 42 which at one end abuts against a thrust ring 43, a ring of thrust rollers 44 being provided between this ring and a similar ring 45 on the disc 12.

The mode of action of the mechanism is similar to that described with reference to FIGURE 1. To engage the disc 12 with the member 14, motive liquid is admitted to the cylinder 31. To engage the disc 21 with the disc 12, motive liquid is admitted to the larger cylinder 36 and after the said discs have been interengaged continued movement of the piston 37 effects disengagement of the disc 12 from the said member 14. The spring 42 serves to effect return movements of the pistons when the pressure of the motive liquid is released.

Having thus described my invention what I claim as new and desire to secure by Letters Patent is:

1. In a power transmission mechanism, a housing, an epicyclic gear train within the housing including sun gear means, a planet carrier means and planet gear means on the planet carrier means in engagement with the sun gear means, relatively rotatable members within the housing, one of said rotatable members being operably connected to one of said means of the gear train and the other of said rotatable members being operably connected to another of said means of the gear train, a clutch comprising in combination a first axially movable disc having a slidable but non-rotatable connection with said sun gear means, a peripheral rim provided on said disc, and having parts of truncated conical form extending laterally from opposite sides of said disc, a fixed part in said housing complementary to and adatped to be frictionally engaged by the exterior of one of the laterally extending parts of said rim, a second axially movable disc arranged coaxially with and at one side of said first disc, and having a slidable but non-rotatable connection with another of said relatively rotatable members, a peripheral rim of truncated conical form provided on said second disc, and adapted to frictionally engage with the interior of the other laterally extending part of the peripheral rim on said first disc, spring means urging the two discs into positions in which the rim part of said first disc is disengaged from said fixed part and the rim of said second disc, a first hydraulic actuating means arranged to act on and move said first disc in the direction for causing frictional engagement of its rim part with said fixed part, and a second hydraulic actuating means arranged to act on and move said second disc in the direction for causing frictional engagement between its rim and the rim part on said first disc, and thereafter to impart movement through said second disc to said first disc against the sustained hydraulic pressure of said first hydraulic actuating means and maintaining such pressure of the first hydraulic actuating means for disengaging the rim part on said first disc from said fixed part.

2. In a power transmission mechanism, a housing, an epicyclic gear train within the housing including sun gear means, a planet carrier means and planet gear means on the planet carrier means in engagement with the sun gear means, relatively rotatable members within the housing, one of said rotatable members being operably connected to one of said means of the gear train and the other of said rotatable members being operably connected to another of said means of the gear train, a first axially movable frictional engaging means operably connected with the sun gear means and including a surface adapted to frictionally engage with the interior of the housing, a second axially slidable frictional engaging means operably connected with another of said relatively rotatable members and including a surface adapted to frictionally engage with said first frictional engaging means, and hydraulic actuating means operably coupled with each of said first and second frictional engaging means whereby upon application of hydraulic pressure to said first frictional engaging means, said first frictional engaging means is axially displaced so that its surface engages said housing and upon application of hydraulic pressure to the actuating means for said second frictional engaging means, the surface of said second frictional engaging means engages the first frictional engaging means against the hydraulic pressure of the actuating means for the first frictional engaging means and thereafter disengages the surface of the first frictional engaging means from the housing while maintaining the hydraulic pressure of said actuating means of the first frictional engaging means.

3. In a power transmission mechanism, a housing, an epicyclic gear train within the housing including sun gear means, a planet carrier means and planet gear means on the planet carrier means in engagement with the sun gear means, relatively rotatable members within the housing, one of said rotatable members being operably connected to one of said means of the gear train and the other of said rotatable members being operably connected to another of said means of the gear train, a first axially movable frictional engaging means operably connected with the sun gear means and including a surface adapted to frictionally engage with the interior of the housing, a second axially slidable frictional engaging means operably connected with another of said relatively rotatable members and including a surface adapted to frictionally engage with said first frictional engaging means, and pressure actuating means operably coupled with each of said first and second frictional engaging means whereby upon application of pressure to said first frictional engaging means, said first frictional engaging means is axially displaced so that its surface engages said housing and upon application of pressure to the actuating means for said second frictional engaging means, the surface of said second frictional engaging means engages the first frictional engaging means against the pressure of the actuating means for the first frictional engaging means and thereafter disengages the surface of the first frictional engaging means from the housing while maintaining the pressure of said actuating means of the first frictional engaging means.

References Cited in the file of this patent

UNITED STATES PATENTS

| 1,461,800 | Lewis | July 17, 1923 |
| 2,003,795 | Wilsing | June 4, 1935 |
| 2,069,408 | Forichon | Feb. 2, 1937 |
| 2,462,657 | McNairy | Feb. 22, 1949 |
| 2,485,622 | Bariffi | Oct. 25, 1949 |
| 2,670,828 | McFarland | Mar. 2, 1954 |
| 2,936,865 | Tuck et al. | May 17, 1960 |